(12) United States Patent
Lee

(10) Patent No.: US 10,372,165 B2
(45) Date of Patent: Aug. 6, 2019

(54) DISPLAY DEVICE AND CONTROL METHOD

(71) Applicant: LG ELECTRONICS INC., Seoul (KR)

(72) Inventor: Doyoung Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 38 days.

(21) Appl. No.: 15/533,353

(22) PCT Filed: Dec. 23, 2014

(86) PCT No.: PCT/KR2014/012681
§ 371 (c)(1),
(2) Date: Jun. 5, 2017

(87) PCT Pub. No.: WO2016/104822
PCT Pub. Date: Jun. 30, 2016

(65) Prior Publication Data
US 2017/0344071 A1 Nov. 30, 2017

(51) Int. Cl.
*G06F 1/16* (2006.01)
*G02F 1/1333* (2006.01)
(Continued)

(52) U.S. Cl.
CPC .......... *G06F 1/1652* (2013.01); *G02F 1/1333* (2013.01); *G06F 3/011* (2013.01); *G06F 3/0481* (2013.01); *H04M 1/0268* (2013.01)

(58) Field of Classification Search
None
See application file for complete search history.

(56) References Cited

U.S. PATENT DOCUMENTS 8,810,627 B1* 8/2014 Cho .................. H04N 5/2258
348/38
9,811,160 B2* 11/2017 Kim .................... G06F 3/013
(Continued)

FOREIGN PATENT DOCUMENTS

JP 2006287982 10/2006
KR 1020080035709 4/2008
(Continued)

OTHER PUBLICATIONS

PCT International Application No. PCT/KR2014/012681, Written Opinion of the International Searching Authority dated Sep. 18, 2015, 16 pages.

*Primary Examiner* — Lunyi Lao
*Assistant Examiner* — Benjamin X Casarez
(74) *Attorney, Agent, or Firm* — Lee, Hong, DeGerman, Kang & Waimey

(57) ABSTRACT

A display device and a control method are disclosed. The display device comprises: a flexible display unit capable of displaying an image in two directions; a camera unit, which is disposed in a first direction and receives as an input the image in the first direction; and a control unit, wherein the control unit can temporarily capture the image input in the first direction and display the temporarily captured image in the first direction on the flexible display unit in a second direction or a bent region of the flexible display unit when the region of the flexible display unit, which includes the camera unit, is bent in the second direction at an angle equal to or greater than a preset angle, so that the camera unit can receive as an input the image in the second direction, which is opposite the first direction.

20 Claims, 12 Drawing Sheets

(51) Int. Cl.
*G06F 3/01* (2006.01)
*G06F 3/0481* (2013.01)
*H04M 1/02* (2006.01)

(56) References Cited

U.S. PATENT DOCUMENTS

| | | | | |
|---|---|---|---|---|
| 9,900,488 B2* | 2/2018 | Xu | ................ | H04N 5/232 |
| 2004/0023685 A1* | 2/2004 | Nakamura | .......... | H04M 1/0214 |
| | | | | 455/550.1 |
| 2005/0143124 A1* | 6/2005 | Kennedy | ............... | G06F 1/1626 |
| | | | | 455/556.1 |
| 2010/0056223 A1* | 3/2010 | Choi | .................... | G06F 1/1601 |
| | | | | 455/566 |
| 2013/0265262 A1* | 10/2013 | Jung | ....................... | G06F 3/041 |
| | | | | 345/173 |
| 2014/0285476 A1* | 9/2014 | Cho | ..................... | G06F 1/1601 |
| | | | | 345/204 |
| 2015/0146069 A1* | 5/2015 | Yamazaki | .......... | H04N 5/23293 |
| | | | | 348/333.01 |
| 2015/0381929 A1* | 12/2015 | Lee | ..................... | H04M 1/0202 |
| | | | | 348/14.03 |
| 2016/0026219 A1* | 1/2016 | Kim | .................... | H04M 1/0245 |
| | | | | 345/173 |
| 2016/0026381 A1* | 1/2016 | Kim | .................... | G06F 3/04817 |
| | | | | 715/761 |
| 2016/0085325 A1* | 3/2016 | Lee | ..................... | G06K 9/00288 |
| | | | | 345/173 |
| 2016/0163282 A1* | 6/2016 | Hsieh | .................... | G09G 5/006 |
| | | | | 345/681 |
| 2016/0373654 A1* | 12/2016 | Kwon | ................. | G06F 3/04845 |
| 2017/0212556 A1* | 7/2017 | Jovanovic | ............. | G06F 1/1652 |

FOREIGN PATENT DOCUMENTS

| | | |
|---|---|---|
| KR | 1020120056512 | 6/2012 |
| KR | 1020140044665 | 4/2014 |
| KR | 1020140099006 | 8/2014 |

* cited by examiner (a)

(b)

(a)

(b)

(a)

(b)

(a)

(b)

(a)

(b)

(a)

(b)

(a)

(b)

(a)

(b)

(c)

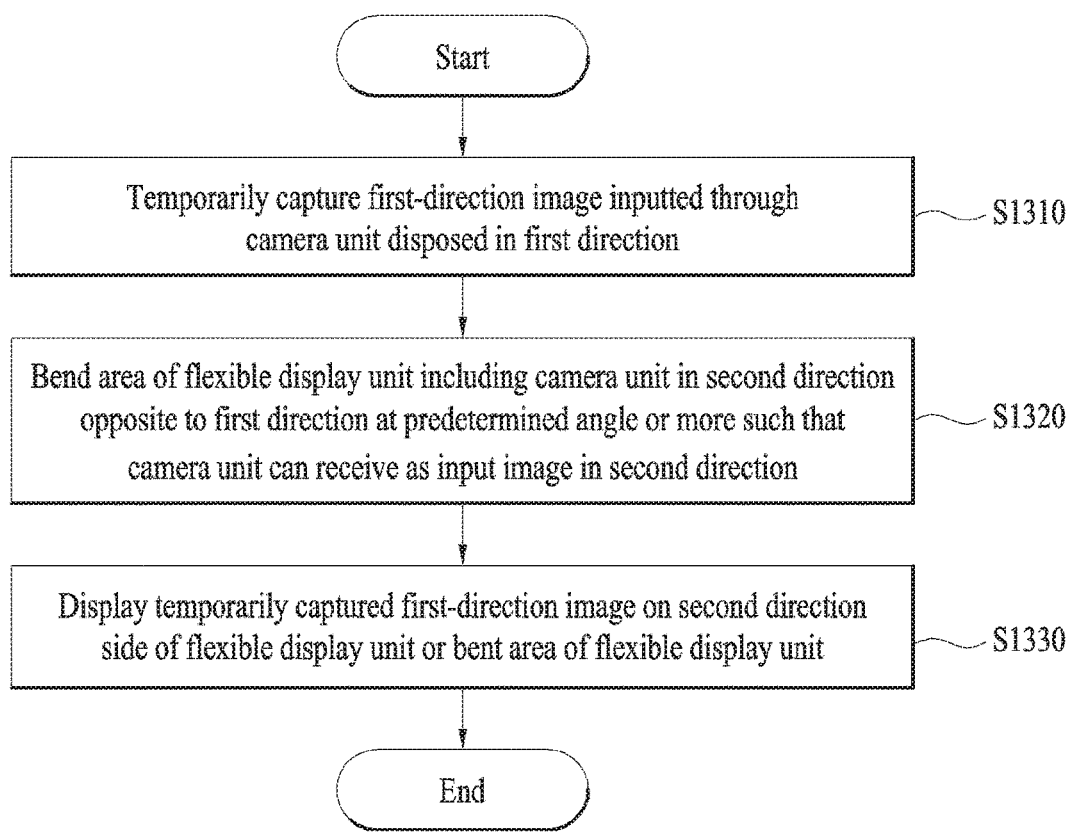

DISPLAY DEVICE AND CONTROL METHOD

CROSS-REFERENCE TO RELATED APPLICATIONS

This application is the National Stage filing under 35 U.S.C. 371 of International Application No. PCT/KR2014/012681, filed on Dec. 23, 2014, the contents of which are all hereby incorporated by reference herein in its entirety.

TECHNICAL FIELD

The present invention relates to a display device and control method thereof.

BACKGROUND ART

Various electronic devices have been developed with the advance of technologies. For example, display devices including a touch display module for allowing a user to enter an input by touching a screen have been used. In addition, display devices including various display modules have been developed.

Recently, a flexible display module have been researched and developed. Specifically, a prototype of a display device including the flexible display module has been released and many ongoing efforts are made to commercialize the display device including the flexible display module.

Meanwhile, two cameras are included in the current display devices. That is, a user can use one of the two cameras to photograph an object and use the other to photograph him or herself. Alternatively, the two cameras can be used for video calls. However, considering the fact that only a single camera is installed in a flexible display device, it is necessary to develop UI/UX for the flexible display device including the single camera.

DISCLOSURE OF THE INVENTION

Technical Task

The present invention is devised to overcome the aforementioned problem. The object of the present invention is to enable a user to photograph an object in various directions through a screen displayed on a display unit using a single camera.

Technical Solutions

In an aspect of the present invention, provided herein is a display device, including: a flexible display unit configured to display images in two directions; a camera unit disposed in a first direction and configured to receive as an input an image in the first direction; and a control unit. In this case, the control unit may be configured to temporarily capture the image received in the first direction; and when an area of the flexible display unit, in which the camera unit is included, is bent in a second direction opposite to the first direction at a predetermined angle or more such that the camera unit can receive as an input an image in the second direction, display the image temporarily captured in the first direction on a second direction side of the flexible display unit or the bent area of the flexible display unit.

The control unit may be configured to temporarily capture an image in the first direction at a predetermined period and delete the image temporarily captured in the first direction after elapse of a predetermined time.

When the area of the flexible display unit, in which the camera unit is included, is bent in the second direction at the predetermined angle or more, the camera unit may be configured to receive as the input the image in the second direction. In addition, the control unit may be configured to rotate the image received in the second direction in the gravity direction of the display device, crop the rotated image, and display the cropped image.

When the image temporarily captured in the first direction is displayed on the bent area of the flexible display unit, the control unit may be configured to display the image received in the second direction on the second direction side of the flexible display device.

When the image temporarily captured in the first direction is displayed on the second direction side of the flexible display unit, the control unit may be configured to display the image received in the second direction on the bent area of the flexible display unit.

The control unit may be configured to further display at least one photography image associated with the image temporarily captured in the first direction on the second direction side of the flexible display unit.

The photography image associated with the image temporarily captured in the first direction may include at least one of an image including the same person, an image including the same background, and an image photographed within a predetermined time range.

When the bent area of the flexible display unit is unfolded, the control unit may be configured to delete the image temporarily captured in the first direction.

The control unit may be configured to control the flexible display unit to display a bending line of the bent area of the flexible display unit on the second direction side of the flexible display unit.

The control unit may be configured to control the flexible display unit to display an area corresponding to a position of the camera unit on the second direction side of the flexible display unit.

The control unit may be configured to display a menu related to photography on the bent area of the flexible display unit.

The control unit may be configured to generate a photography button at a boundary of the bent area of the flexible display unit and the second direction side of the flexible display unit such that the photography button is included in both of the bent area of the flexible display unit and the second direction side of the flexible display unit.

When only a part of the photography button, which is included in the bent area of the flexible display unit, is selected, the control unit may be configured to photograph an image displayed on the bent area of the flexible display unit.

When only a part of the photography button, which is included in the second direction side of the flexible display unit, is selected, the control unit may be configured to photograph an image displayed on the second direction side of the flexible display unit.

When the entirety of the photography button included in the both of the bent area of the flexible display unit and the second direction side of the flexible display unit is selected, the control unit may be configured to photograph images displayed on the bent area of the flexible display unit and the second direction side of the flexible display unit.

In another aspect of the present invention, provided herein is a method for controlling a display device including a flexible display unit capable of displaying images in two directions, including; temporarily capturing an image in a first direction by receiving as an input the image through a camera unit disposed in the first direction; bending an area of the flexible display unit, in which the camera unit is included, in a second direction opposite to the first direction at a predetermined angle or more such that the camera unit can receive as an input an image in the second direction; and displaying the image temporarily captured in the first direction on a second direction side of the flexible display unit or the bent area of the flexible display unit.

The display device control method may further include when the bent area of the flexible display unit, in which the camera unit is included, is bent in the second direction at the predetermined angle or more, receiving as the input as the image in the second direction; and rotating the image received in the second direction in the gravity direction of the display device, cropping the rotated image, and displaying the cropped image.

Displaying the image temporarily captured in the first direction may include displaying the image temporarily captured in the first direction on the second direction side of the flexible display unit and displaying the image received in the second direction may include displaying the image received in the second direction on the bent area of the flexible display unit.

The display device control method may further include when the bent area of the flexible display unit is unfolded, displaying a bending line of the bent area of the flexible display unit on the second direction side of the flexible display unit.

The display device control method may further include generating a photography button at a boundary of the bent area of the flexible display unit and the second direction side of the flexible display unit such that the photography button is included in both of the bent area of the flexible display unit and the second direction side of the flexible display unit.

Advantageous Effects

According to embodiments of the present invention, a display device can allow a user to photograph an object in various angles using a single camera while the user watches a captured image.

In addition, the user can select one of two directions and photograph an object in the selected direction through the display device.

Moreover, the display device can display a bent area.

Furthermore, the display device can correct an image captured without consideration of a camera angle in the vertical direction.

DESCRIPTION OF DRAWINGS

FIG. 13 is a flowchart for explaining a method of controlling the display device according to an embodiment of the present invention.

BEST MODE FOR INVENTION

Figure 1:
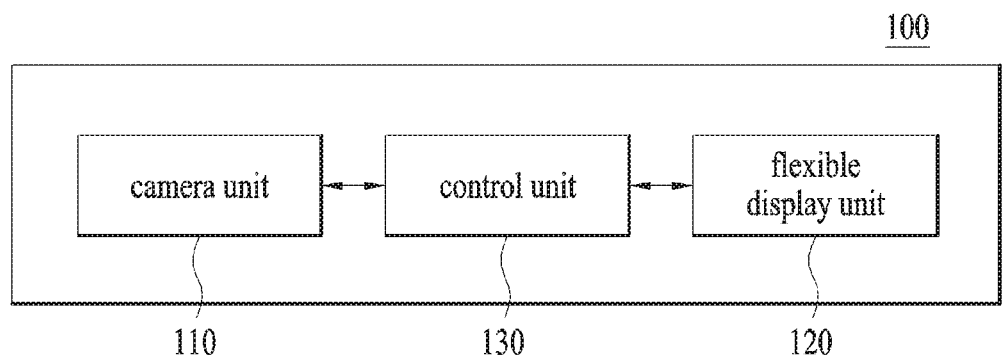
FIG. 1 is a block diagram of a display device according to an embodiment.

Hereinafter, the embodiments of the present invention, which are devised to achieve the above-described objects, will be described with reference to the accompanying drawings. The configurations and applications of the embodiments of the present invention, which are shown in the drawings and described in the specification, can also be interpreted as embodiments, and thus the technical principles of the present disclosure are not limited thereto.

Although the terms used in the present specification are selected, as much as possible, from general terms that are widely used at present while taking into consideration their functions, these terms may be replaced by other terms based on intentions of those skilled in the art, customs, emergence of new technologies, or the like. In addition, terms that are arbitrarily selected by the applicant may be used in a specific case. In this specific case, meanings of these terms will be disclosed in detail in the corresponding part of the description of the invention. Accordingly, the terms used herein should be defined based on practical meanings thereof and the whole content of this specification, rather than based on names of the terms.

FIG. 1 is a block diagram of a display device according to an embodiment.

Referring to FIG. 1, the display device 100 may include a camera unit 110, a flexible display unit 120, and a control unit 130.

The camera unit 110 is disposed in a first direction and captures an image in the first direction. In a general display device, a main camera unit and a display unit can be disposed in opposite directions. Thus, a user can place the camera unit to face an object and the display unit to face the user. Thereafter, the user can check an image captured by the camera unit through the display unit.

In this specification, when a user captures an image using the display device 100, a direction facing an object is defined as a first direction and a direction facing the user is defined as a second direction.

The flexible display unit 120 can be configured to display images in two directions. For example, the flexible display unit 120 can be bent. Alternatively, the flexible display unit 120 may be configured with a bidirectional display module. Further, the flexible display unit 120 may be implemented by combining two display modules. The flexible display unit 120 may include the camera unit 110. That is, the camera unit 110 can be disposed in a boundary area of the flexible display unit 120. Thus, the flexible display unit 120 can display an image on the remaining area except the area in which the camera unit 110 is disposed. Meanwhile, the flexible display unit 120 may include a touch sensor and thus, the user can input a command by touching the flexible display unit 120. That is, the flexible display unit 120 may receive the user's command detected by the touch sensor.

The control unit 130 can be configured to control the camera unit 110 and the flexible display unit 120. In addition, the control unit 130 can temporarily capture an image inputted in the first direction. In detail, the control unit 130 can temporarily capture an image in the first direction during a predetermined period and then delete the image temporarily captured in the first direction after elapse of the predetermined period. Details of temporary capturing will be described later. When an area of the flexible display unit 120, in which the camera unit 110 is included, is bent at a predetermined angle or more in the second direction opposite to the first direction such that a second-direction image can be inputted through the camera unit 110, the control unit 130 can display the image temporarily captured in the first direction on the flexible display unit 120 facing in the second direction or the bent area of the flexible display unit 120.

As an embodiment, the predetermined angle may be set to 90, 160, or 180 degrees. For example, assuming that the predetermined angle is set to 170 degrees, when the area of the flexible display unit 120 where the camera unit 110 is included is bent 170 degrees in the second direction, the control unit 130 can display the image temporarily captured in the first direction. The first-direction image can be displayed on the flexible display unit 120 facing in the second direction or the bent area of the flexible display unit 120, which is adjacent to the camera unit 110.

Figure 2:
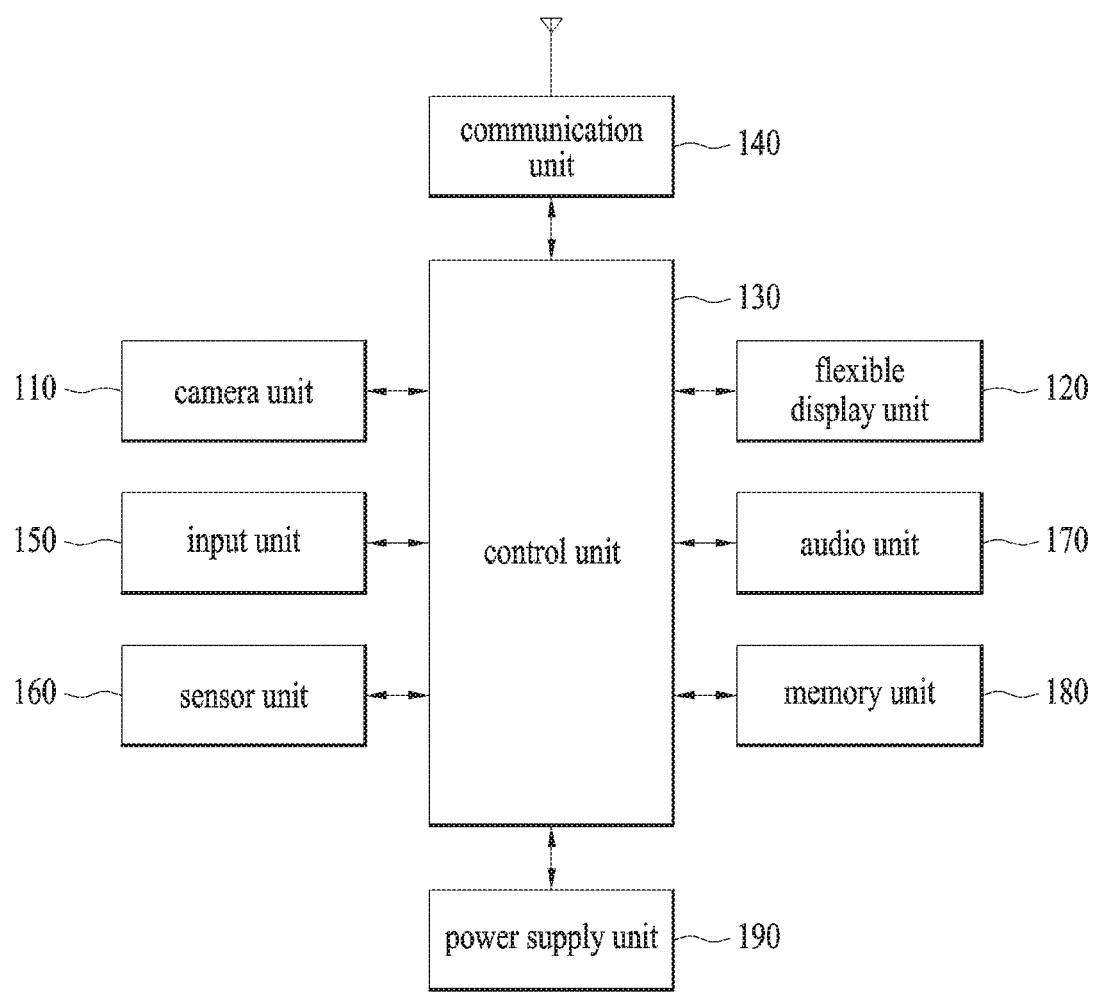
FIG. 2 is a block diagram of a display device according to another embodiment.

FIG. 2 is a block diagram of a display device according to another embodiment.

Referring to FIG. 2, a display device may include the camera unit 110, the flexible display unit 120, the control unit 130, a communication unit 140, an input unit 150, a sensor unit 160, an audio unit 170, a memory unit 180, and a power supply unit 190.

The camera unit 110 can be configured to capture an image of the surrounding environment of the display device and covert the image into an electrical signal. To this end, the camera unit 110 may include an image sensor capable of converting an optical signal into an electrical signal. The image, which is captured and converted into the electrical signal by the camera unit 110, may be stored in the memory unit 180 and then transmitted to the control unit 130. Alternatively, the image may be directly transmitted to the control unit 130. In addition, the image captured by the camera unit 110 may include a still image or a video image. Further, the camera unit 110 may be used as a motion sensor or a video sensor.

The camera unit 110 may include a single camera. The camera unit 110 may be disposed in an area of the flexible display unit 120. Since the flexible display unit 120 including the camera unit 110 can be bent, the camera unit 110 can capture an object in various directions.

The flexible display unit 120 can be configured to display an image on a display screen. The flexible display unit 120 may display the image based on a content executed in the control unit 130 or a control command. The flexible display unit 120 can be freely bent. In addition, the flexible display unit 120 may display images in two directions. Moreover, the flexible display unit 120 may be implemented together with a touch sensor so that the flexible display unit 120 can receive a touch input from the user.

The control unit 130 can be configured to execute a content stored in the memory unit 180, a content received through data communication, and the like. In addition, the control unit 130 can launch various applications and process data in the display device. Moreover, the control unit 130 can control the above-described individual components of the display device and data transmission and reception between the individual components. For executions of various control logics, the control unit 130 may include a processor, an application-specific integrated circuit (ASIC), other chipsets, a logic circuit, a register, a communication modem, and a data processing device, known in the art pertaining to the present disclosure. Further, when the exemplary control logics are implemented as software, the control unit 130 may be implemented as an assembly of program modules. In this case, the program module may be stored in the memory unit 180 and executed by the processor.

The control unit 130 can be configured to temporarily capture an image in the first direction during a predetermined period and delete the image temporarily captured in the first direction after elapse of the predetermined period. When an area of the flexible display unit 120, in which the camera unit 110 is included, is bent at a predetermined angle or more in the second direction, the control unit 130 can display the image temporarily captured in the first direction.

The communication unit 140 can be configured to communicate with an external device using various protocols and transmit and receive data to and from the external device. In this case, the external devices may be a mobile terminal or a fixed terminal. For example, the mobile terminal may include a mobile phone, a smart phone, a tablet personal computer (PC), a smart pad, a laptop, a digital broadcasting terminal, a personal digital assistants (PDA), a portable multimedia player (PMP), a digital camera, a navigator, etc. The fixed terminal may include a desktop, a digital video disc or digital versatile disc (DVD) player, a TV, etc.

The various protocols may include wired or wireless communication protocols. In the case of wired communication, the communication unit 140 may include various input/output interfaces (not shown in the drawing) capable of wired data communication with an external device. For example, the interfaces may include USB (universal serial bus), HDMI (high definition multimedia interface), DVI (digital visual interface), IEEE 1394, and data transmission interfaces according to other similar standards related to data transmission. In the case of wireless communication, the communication unit 140 may include an radio frequency (RF) electrical circuit network for wireless access to external communication networks such as the Internet, LAN (local area network), WAN (wide area network), etc. The wireless communication networks connected through the communication unit 140 may include GSM (global system for mobile communications), EDGE (enhanced data GSM environment), CDMA (code division multiple access), W-CDMA (wideband code division multiple access), TDMA (time division multiple access), Wibro, etc. Further, the wireless communication networks may also include mobile communications such as HSPA (high speed packet access), HSDPA (high speed downlink packet access), LTE (long term evolution) and the like, or short-range communications such as Bluetooth, RFID (radio frequency identification), IrDA (infrared data association), UWB (ultra wideband), ZigBee, WLAN (wireless LAN), Wi-Fi, and the like.

In this case, the wired/wireless interface schemes are merely examples to help understanding of the present invention. Moreover, considering the fact that an interface scheme for information transmission/reception can be freely changed by service providers, the present invention is not limited to the aforementioned interface schemes.

The input unit 150 can be configured to receive a user command from the outside. The input unit 150 can be implemented in various ways. For example, the input unit 150 may be implemented with a touch pad, a button, a soft key, etc. In a broad sense, the input unit 150 may include a microphone, a touch screen, etc. The microphone may receive a user's voice and the touch screen may receive a user's touch gesture. In some cases, the microphone may be included in the audio unit and the touch screen may be included in the flexible display unit.

The sensor unit 160 can be configured to sense a surrounding environment of the display device using at least one sensor installed in the display device and transmit the sensed result to the control unit 130. In addition, the sensor unit 160 can be configured to sense a user input and transmit the sensed user input to the control unit 130. In this case, the sensor unit 160 may include at least one sensing means. For example, the sensing means may include various sensors such as a gravity sensor, a terrestrial magnetism sensor, a motion sensor, a gyro sensor, an acceleration sensor, an infrared ray sensor, an inclination sensor, a brightness sensor, an altitude sensor, an olfactory sensor, a temperature sensor, a depth sensor, a pressure sensor, a bending sensor, an audio sensor, a video sensor, a global positioning system (GPS) sensor, a touch sensor, a fingerprint sensor, and the like. Here, the sensor unit 160 may be the common name of the various sensing means. In addition, the sensor unit 160 may sense various inputs from the user or the environment of the user. Thereafter, the sensor unit 160 may transmit the sensing results to the control unit 130 so that the control unit 130 can perform operation based on the sensing results. The above-described sensing means may be included in the display device as extra elements. Alternatively, the sensing means may be integrated as at least one element and then included in the display device.

According to an embodiment of the present invention, the sensor unit 160 of the display device may be disposed in the flexible display unit 120. By doing so, the display device can sense various user inputs inputted through the flexible display unit 120 using the sensor unit 160. For example, when the sensor unit 160 includes a touch sensor, the display device may receive various user touch inputs inputted through the flexible display unit 120. In addition, when the sensor unit 160 includes a fingerprint sensor, the display device may collect information on user's fingerprints from the user input inputted through the flexible display unit 120. As described above, the display device according to the present invention may be provided with a screen sensor formed by a mutual layer structure of the flexible display unit 120 and the sensor unit 160.

As an embodiment, the sensor unit 160 may sense bending of the flexible display unit 120 and then transmit the sensed signal to the control unit 130. The control unit 130 may detect a bending angle based on the signal transmitted from the sensor unit 160. When the detected bending angle is equal to or greater than a predetermined angle, the control unit 130 may perform related operation. In addition, the sensor unit 160 may sense an inclined degree of the camera unit 110. The control unit 130 may adjust an image angle based on the inclined degree of the camera unit 110, which is sensed by the sensor unit 110.

The audio unit 170 may include an audio output means such as a speaker and an audio input means such as a microphone. The display device may output an audio signal of the executed content through the output means. In this case, the content may be provided by the memory unit 180 or through the communication unit 140 from an external device. The output means may include at least one of an air conduction speaker and a bone conduction speaker. For example, the air conduction speaker may include an earphone. The air conduction speaker generates a sound wave by vibrating the air based on an audio signal. In other words, the sound vibration is transmitted to the eardrum of the ear through the air and the vibration of the eardrum is transmitted to a screw-shaped cochlea through three bones in the eardrum. The cochlea is filled with lymph fluid and the vibration of the lymph fluid is converted into an electric signal and then transferred to the auditory nerve. Through the above procedure, the human brain can recognize a sound. The bone conduction speaker may be disposed in various positions to easily provide a user with an audio signal converted into frequency type vibration. When the bone conduction speaker is used, the audio signal drives the bone conduction speaker and a bone conduction sound wave is transferred to the user's skull. Thus, the frequency type vibration is transferred to the user's inner ear. When the bone conduction speaker is used, the user can hear the audio signal without damage to the eardrum. Meanwhile, the audio unit 170 may be used as an audio sensor.

The memory unit 180 can be configured to store various digital data such as video data, audio data, pictures, applications, etc. In this case, the applications may be programs for operation of the control unit 130. In addition, the video data and pictures may be data obtained through the camera unit 110. The memory unit 180 may be implemented as RAM (random access memory), SRAM (static random access memory), ROM (read only memory), EEPROM (electrically erasable programmable read only memory), PROM (programmable read only memory), etc. In addition, the memory unit 180 may operate as a web storage on the Internet to perform a storage function. Moreover, the memory unit 180 may further include an external storage medium that can be attached and detached to and from the display device. For example, the external storage medium may include a memory card such as CF (compact flash) or SD (secure digital), a memory stick, USB, etc. That is, the external storage medium can be attached and detached to and from the display device and provide contents such as audio data, video data, pictures, applications, etc. to the display device. For example, the storage unit 180 may include a RAM, a ROM, a cache memory, a hard disk drive (HDD), a solid state drive (SDD), a CD, a DVD, a Blu-ray disc, a floppy disk (FD), a magnetic disk, a memory card, a flash memory, an USB memory, etc.

As a power source connected to a battery or an external power supply unit, the power supply unit 190 can be configured to supply power to the display device. The battery may include not only a primary battery but also a secondary battery. The secondary battery may include a lithium ion battery, a lithium polymer battery, a nickel cadmium battery, a nickel hydrogen battery, a nickel zinc battery, etc.

In this specification, the display device may mean various types of devices capable of processing digital data and performing relevant operation. As performance of digital devices is improved, various contents can be executed by the digital devices. For example, the digital devices may include a TV, a laptop computer, a desktop computer, a monitor, a smartphone, a tablet PC, a navigator, a PMP, a terminal for payment, a terminal for security, a kiosk, etc. In particular, the portable device, which has become widely used in recent years, has been used as a device for playing multimedia contents.

Figure 3:
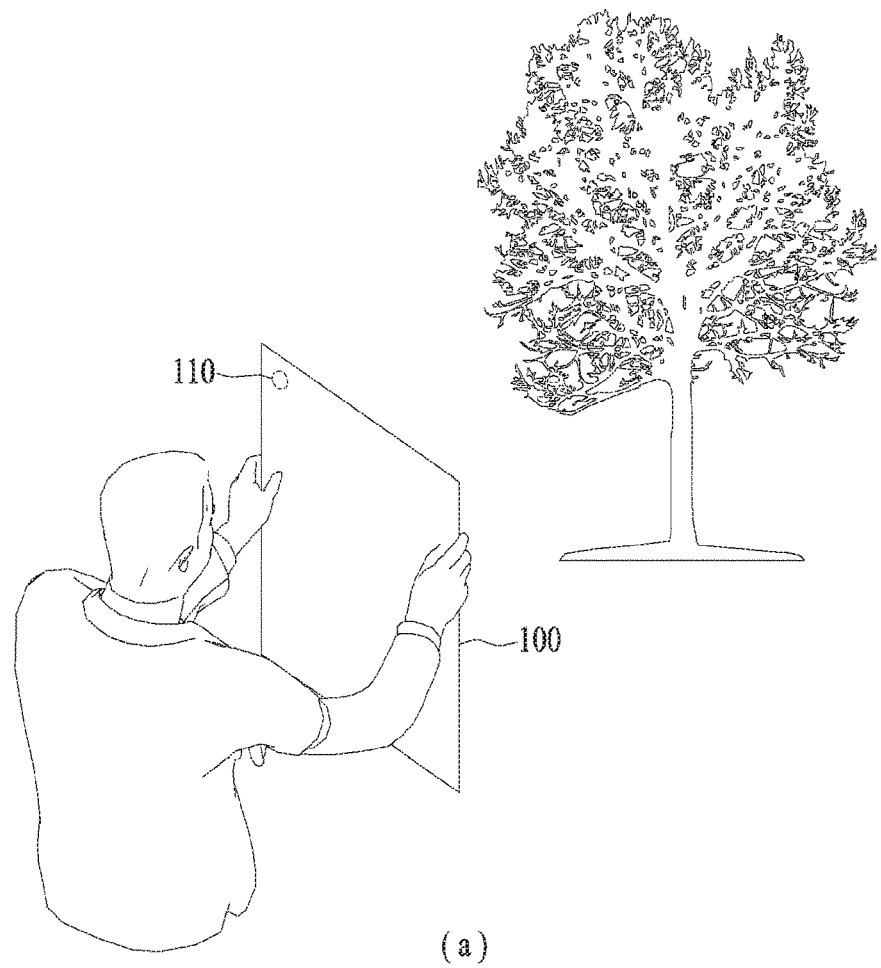
FIG. 3 is a diagram illustrating a first embodiment of photography in a user direction.
Figure 3:
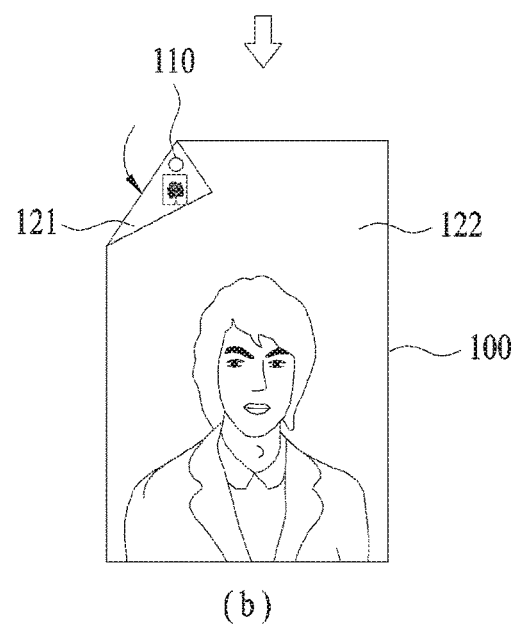

FIG. 3 is a diagram illustrating a first embodiment of photography in a user direction.

Referring to FIG. 3(a), a user photographs an object using the display device 100. In this case, the display device 100 includes the camera unit 110 and the flexible display unit 120. The main area of the display device 100 can be implemented as the flexible display unit 120. Thus, the display device 100 can be freely bent. The camera unit can be disposed in the first direction. Here, the first direction corresponds to a direction opposite to that facing the user as described above. The flexible display unit 120 can display an image in two directions. That is, the flexible display unit 120 may display images not only in the first direction in which the camera unit is disposed but also in the second direction facing the user. As shown in FIG. 3(a), the image captured by the camera unit 110 can be displayed toward the second direction facing the user. In this case, the image captured by the camera unit 110 may be a preview image, a still image, or a video image.

The camera unit 110 can be disposed in an area of the flexible display unit 120. The area of the flexible display unit 120 including the camera unit 110 may be bent toward the second direction facing the user.

FIG. 3 (b) shows a screen of the bent display device. When the flexible display unit 120 including the camera unit 110 is bent, the display device 100 may sense the bending of the flexible display unit 120. When the flexible display unit 120 is bent at a predetermined angle or more, the display device 100 can display an image temporarily captured in the first direction on the bent area 121 of the flexible display unit 120. In addition, the display device 100 can display an image inputted through the camera unit 110 on a second direction side 122 of the flexible display unit 120. For example, the predetermined angle may be set to a random angle in the range of 90 to 180 degrees.

As an embodiment, when the area of the flexible display unit 120 including the camera unit 110 is bent at 180 degrees, the display device can display a user's image on the second direction side 122 of the flexible display unit 120. In this case, the size of the image temporarily captured in the first direction may be proportional to that of the bent area 121 of the flexible display unit 120. That is, if the bent area 121 of the flexible display unit 120 is large, the size of the image temporarily captured in the first direction may be increased. On the other hand, if the bent area 121 of the flexible display unit 120 is small, the size of the image temporarily captured in the first direction may be decreased.

Figure 4:
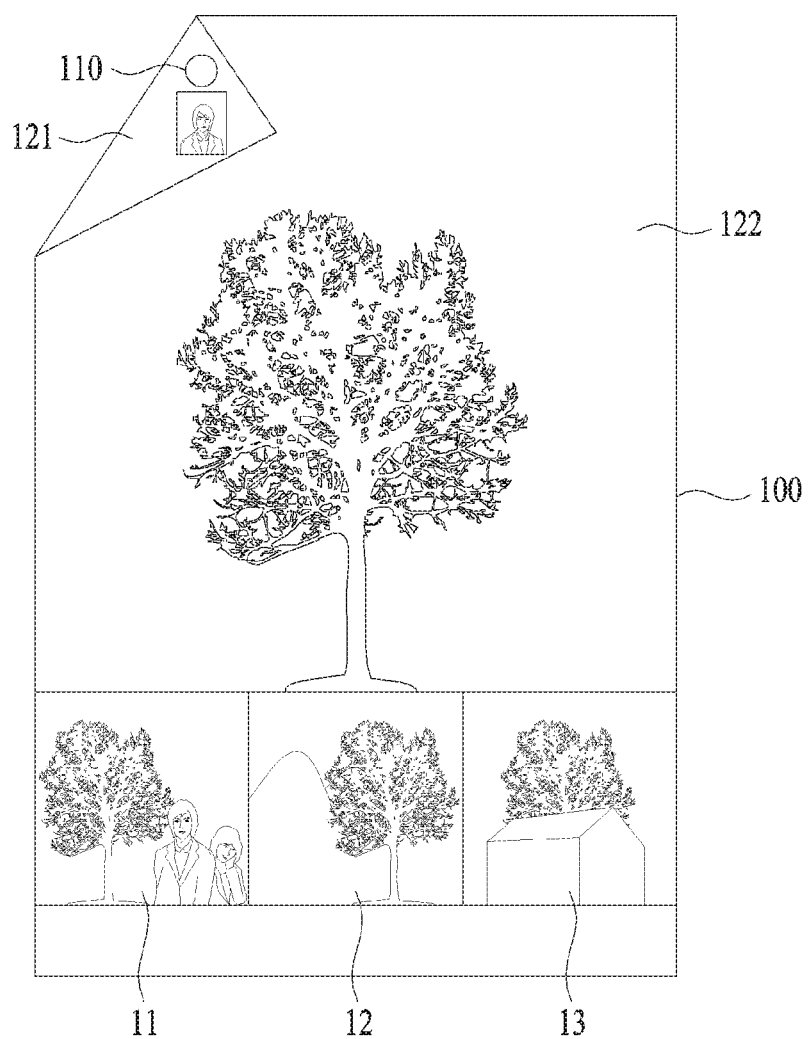
FIG. 4 is a diagram illustrating a second embodiment of photography in a user direction.

FIG. 4 is a diagram illustrating a second embodiment of photography in a user direction.

FIG. 4 shows a screen of the bent display device. When the flexible display unit 120 is bent at the predetermined angle or more, the display device 100 can display the image temporarily captured in the first direction on the second direction side 122 of the flexible display unit 120. In this case, the display device 100 can display the image inputted through the camera unit 110 on the bent area 121 of the flexible display unit. The display device 100 can display images 11, 12, and 13 related to the image temporarily captured in the first direction on the second direction side 122 of the flexible display unit 120. That is, the display device 100 may display a photography image related to the image temporarily captured in the first direction on the second direction side 122 of the flexible display unit 120. For example, the photography image related to the first-direction image may include an image including the same person, an image including the same background, or an image captured within a predetermined time.

As an embodiment, the camera unit 110 may temporarily capture an image including a tree. The display device 100 may recognize a shape of the tree in the temporarily captured image. Thereafter, the display device 100 may display an image including the tree in temporarily captured image on the second direction side 122 of the flexible display unit 120. In addition, the display device 100 may select an image including a tree similar to that in the temporarily captured image from stored images and then display the selected image on the second direction side 122 of the flexible display unit 120. The images 11, 12, and 13 may be selected by the user. The display device 100 may replace the image temporarily captured in the first direction with a selected image. In other words, the display device 100 may select one of the related images and then replace the image temporarily captured in the first direction with the selected image. For example, when the user selects the image 13 including a tree and house, the display device 100 may display the image 13 including the tree and house instead of the temporarily captured image including the tree.

Meanwhile, when the flexible display unit 120 is bent at the predetermined angle or more, the display device 100 may display the image temporarily captured in the first direction on the second direction side 122 of the flexible display unit 120 or the bent area 121 of the flexible display unit 120. To this end, the display device 100 should first temporarily capture the image in the first direction. Hereinafter, a procedure for temporarily capturing an image in the first direction will be described.

Figure 5:
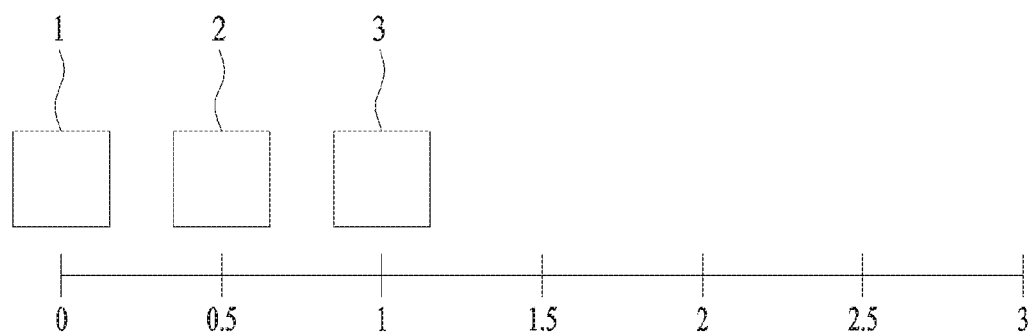
FIG. 5 is a diagram illustrating an embodiment of temporarily storing an image in a first direction in which a camera is disposed.
Figure 5:
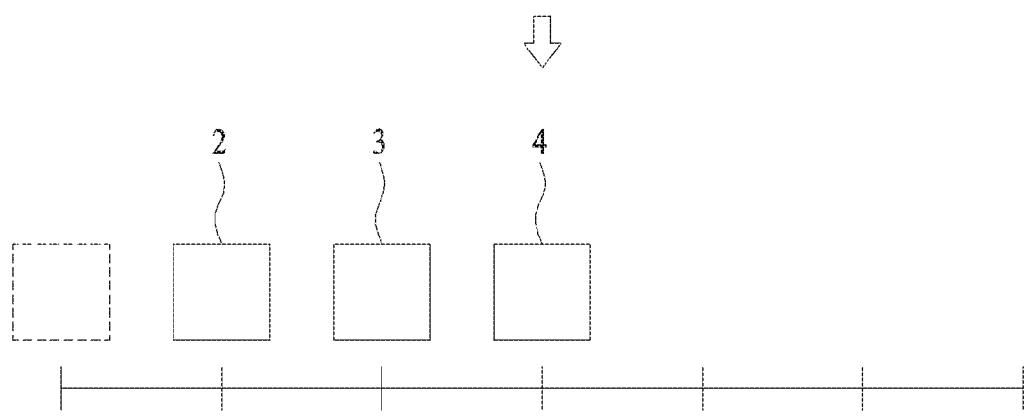

FIG. 5 is a diagram illustrating an embodiment of temporarily storing an image in a first direction in which a camera is disposed.

FIG. 5(a) shows images temporarily captured at a predetermined time interval. According to an embodiment, a capturing time interval is set to 0.5 seconds and the number of temporarily captured images is set to 3. When the camera unit 110 is driven, the display device 100 can temporarily capture an image according to the configuration. That is, when the camera unit 110 is driven, the display device 100 may temporarily capture an image 1 at 0 second. The display device 100 may temporarily capture an image 2 after 0.5 seconds. Thereafter, the display device 100 may temporarily capture an image 3 again after 0.5 seconds. In other words, when the camera unit 110 is driven, the display device 100 may temporarily capture images every 0, 0.5 and 1 seconds. The display device 100 may store the images 1, 2, and 3 respectively captured after 0, 0.5, and 1 seconds from the time when the camera unit 100 is driven.

FIG. 5(b) shows a procedure after storing the predetermined number of images. As described with reference to FIG. 5(a), after temporarily capturing the image after 1 second from the time at which the camera unit 100 is driven, the display device can temporarily capture an image 4 again after 0.5 seconds. When the number of the temporarily captured images is set to 3, the display device 100 can delete the oldest image 1. Thus, the display device 100 can store the images temporarily captured at 0.5, 1, and 1.5 seconds from the time when the camera unit 100 is driven. The display device 100 may temporarily capture a new image every 0.5 seconds and delete the oldest image in the same manner. That is, the display device 100 may temporarily capture an image in the first direction at a predetermined period and then delete the image temporarily captured in the first direction after elapse of a predetermined time. In this case, the capturing time interval and the number of the temporarily captured images may have different values. That is, the capturing time interval may be set to 0.1 seconds, 1 second, or the like and the number of the temporarily captured images may be set to 1, 5, 10, or the like.

When the flexible display unit 120 is bent at the predetermined angle or more, the display device 100 may display one image as the first-direction image. For example, the display device 100 may display the most recently temporarily-captured image as the first-direction image. Alternatively, considering that a prescribed time is required for the flexible display unit 120 to be bent, the display device 100 may display the oldest temporarily-captured image as the first-direction image. Further, the display device 100 may display the image temporarily captured before 1 second from the time of recognizing the bending as the first-direction image. For example, the bending recognition time may correspond to the time when the flexible display unit 120 is bent at the predetermined angle or more. That is, when images are temporarily captured at 0.5, 1, 1.5, and 2 seconds and the bending recognition time is 1.8 seconds, the time before 1 second from the bending recognition time is 0.8 second. Thus, in this case, the image temporarily captured before 1 second from the bending recognition time may correspond to the image captured at 0.5 seconds.

Meanwhile, when the flexible display unit 120 including the camera unit 110 is bent, an angle of the camera unit 110 may incline. Therefore, it is necessary to adjust an image based on the angle of the camera unit 110. Hereinafter, a description will be given of adjustment of an image direction.

Figure 6:
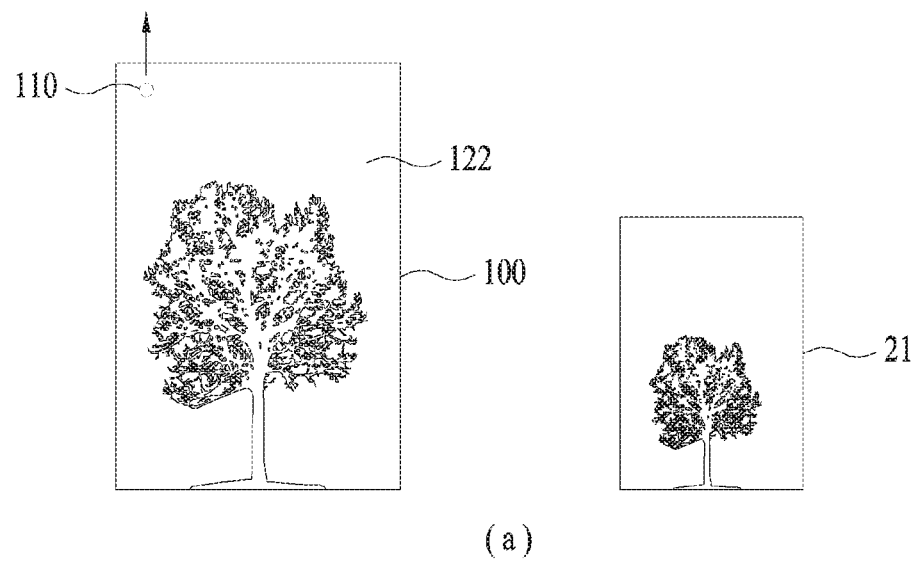
FIG. 6 is a diagram illustrating an embodiment of adjusting an image direction.
Figure 6:
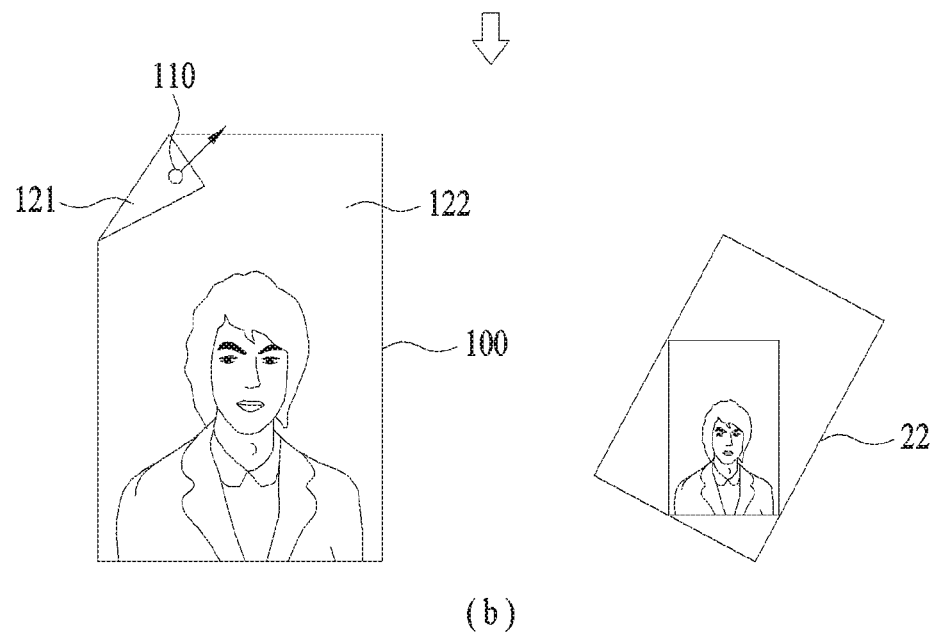

FIG. 6 is a diagram illustrating an embodiment of adjusting an image direction.

FIG. 6(*a*) shows an image inputted through the camera unit 110 in the first direction. As described above, the display device 100 may include the camera unit 110 disposed in the first direction and the flexible display unit 120 capable of displaying in two direction. When the flexible display unit 120 is not bent, the display device 100 may display an image inputted in the second direction through the camera unit 110 on the second direction side 122 of the flexible display unit 120. In this case, since the upper direction of the display device 100 matches that of the camera unit 110, a direction of an image 21 recognized by the camera unit 110 also matches that of the image displayed on the second direction side 122 of the flexible display unit 120. In other words, the display device 100 can display the image inputted through the camera unit 110 without adjusting a direction or angle thereof.

FIG. 6(*b*) shows an image inputted in the second direction through the camera unit 110. The flexible display unit 120 can be bent. When the flexible display unit 120 is bent at the predetermined angle or more, the display device 100 can display the image temporarily captured in the first direction on an area of the flexible display unit 120 and the image inputted in the second direction through the camera unit 110 on a different area of the flexible display unit 120. As shown in FIG. 6(*b*), the display device 100 may display the second-direction image on the second direction side 122 of the flexible display unit 120. However, in this case, the upper direction of the display device 100 is different from that of the camera unit 110. That is, the upper direction of the display device 100 is the vertical direction, whereas the upper direction of the camera unit 110 is a direction inclined by a certain angle to the right with respect to the vertical direction. An image 22, which is recognized by the camera unit 110, may be inclined by a certain angle to the left with respect to the camera unit 110. If the display device 100 dose not adjust the image 22 recognized by the camera unit 110, the display device 100 may display the image 22 inclined by the certain angle to the left.

To prevent this, the display device 100 may adjust the inclined image by sensing an inclination angle of the camera unit 110. The display device 100 may sense the inclination angle of the camera unit 110 and then rotate the image of the camera unit 110 by the inclination angle in the opposite direction. That is, the bottom direction of the image 22 recognized by the camera unit 110 may match the gravity direction of the display device 100. The display device 100 may crop the image 22 by considering the screen ratio of the flexible display unit 120 with respect to the rotation direction of the image 22. The display device 100 may display the cropped image on the second direction side 122 of the flexible display unit 120. That is, the display device 100 may rotate the image 22 inputted in the second direction such that the bottom direction of the image 22 matches the gravity direction of the display device 100, crop the rotated image, and then display the cropped image.

The display device 100 may display an image on each of the second direction side of the flexible display unit and the bent area of the flexible display unit. In addition, the display device 100 may also display a control menu on the bent area of the flexible display unit.

Figure 7:
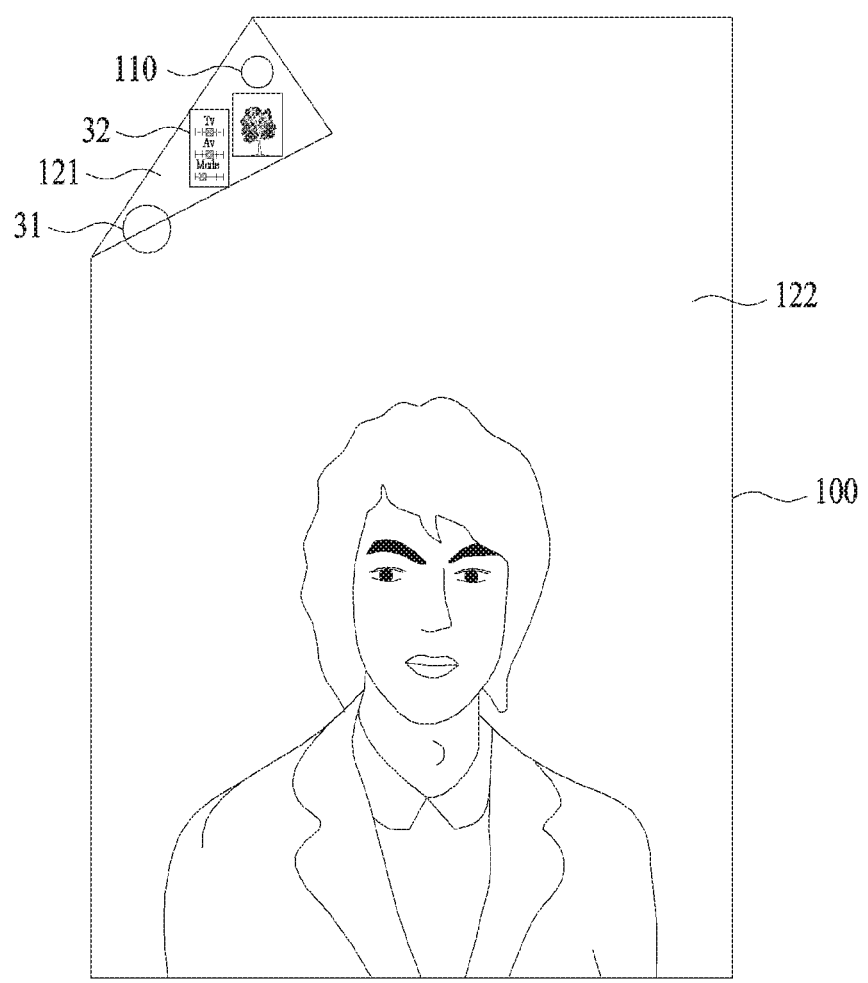
FIG. 7 is a diagram for explaining an UI in a bending area according to an embodiment.

FIG. 7 is a diagram for explaining an UI in a bending area according to an embodiment.

FIG. 7 shows a control menu displayed together with an image. The first-direction image can be displayed on the bent area 121 of the flexible display unit 120 and the second-direction image can be displayed on the second direction side 122 of the flexible display unit 120. In some cases, the second-direction image can be displayed on the bent area 121 of the flexible display unit 120 and the first-direction image can be displayed on the second direction side 122 of the flexible display unit 120.

A menu 32 for photography can be displayed on the bent area 121 of the flexible display unit 120. As an embodiment, the photography-related menu 32 may include an automatic mode, an aperture priority mode, a shutter priority mode, a manual mode, a portrait mode, a night scene mode, a sport mode, a landscape mode, a continuous shooting mode, a white balance adjustment mode, an exposure adjustment mode, a flash setting menu, etc. In addition, the display device 100 may display a photography button 31. The photography button 31 may be displayed across the bent area 121 of the flexible display unit 120 and the second direction side 122 of the flexible display unit 120. That is, the display device 100 may generate the photography button 31 in a boundary area of the bent area 121 of the flexible display unit 120 and the second direction side 122 of the flexible display unit 120 such that the photography button 31 is partially included in both of the bent area 121 of the flexible display unit 120 and the second direction side 122 of the flexible display unit 120.

The display device 100 may perform different operation according to a selected area of the photography button 31 partially included in both of the bent area 121 of the flexible display unit 120 and the second direction side 122 of the flexible display unit 120.

Figure 8:
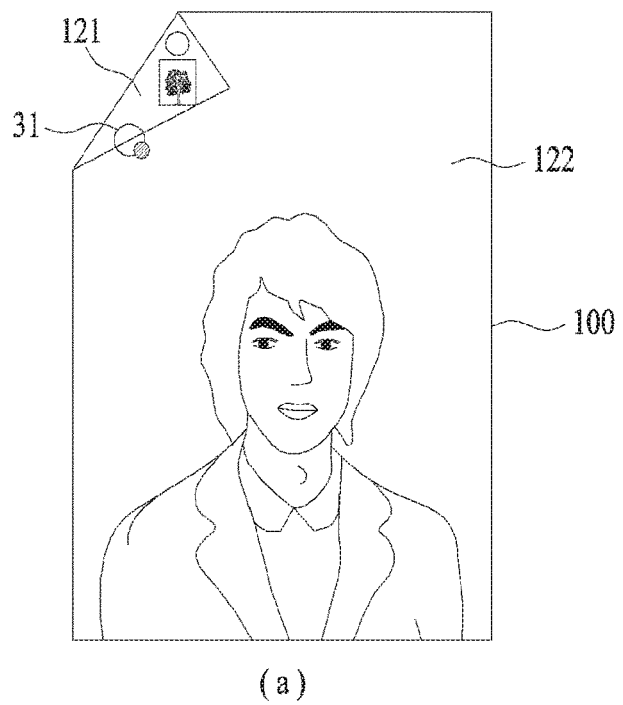
FIG. 8 is a diagram illustrating an embodiment of selecting and capturing an image in a second direction facing a user.
Figure 8:
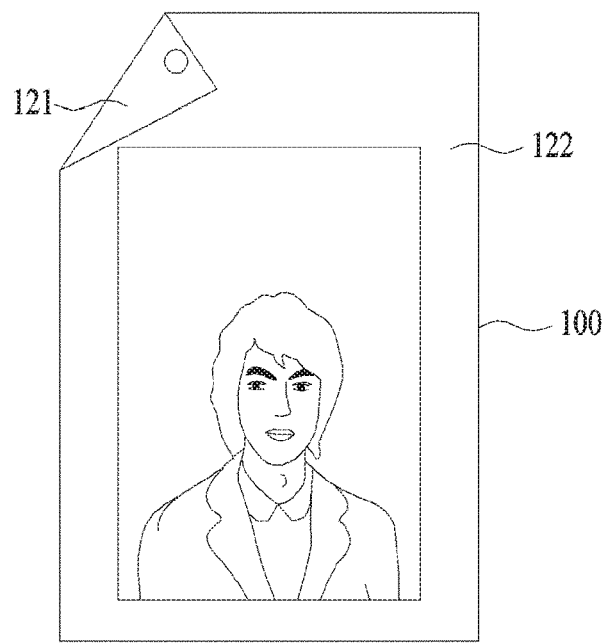

FIG. 8 is a diagram illustrating an embodiment of selecting and capturing an image in a second direction facing a user.

FIG. 8(*a*) shows a screen where the photography button 31 included in the second direction side 122 of the flexible display unit 120 is selected. In this case, the second-direction preview image may be displayed on the second direction side 122 of the flexible display unit 120 and the temporarily captured first-direction may be displayed on the bent area 121 of the flexible display unit 120. As described with reference to FIG. 7, the photography-related menu may be displayed on the bent area 121 of the flexible display unit 120. In addition, the photography button 31 may be displayed in the boundary area of the bent area 121 of the flexible display unit 120 and the second direction side 122 of the flexible display unit 120. In this case, the photography button 31 included in the second direction side 122 of the flexible display unit 120 may be selected.

FIG. 8(b) shows a photographed image. When the photography button 31 included only in the second direction side 122 of the flexible display unit 120 is selected, the second-direction image previewed on the second direction side 122 of the flexible display unit 120 can be photographed. That is, when the photography button 31 included in the second direction side 122 of the flexible display unit 120 is selected from the entirety of the photography button 31, the display device 100 may photograph the image displayed on the second direction side 122 of the flexible display unit 120. In this case, the photographed image may be displayed on the second direction side 122 of the flexible display unit 120 or stored. When the photography is terminated, the display device 100 may display a preview image on the second direction side 122 of the flexible display unit 120 again.

Figure 9:
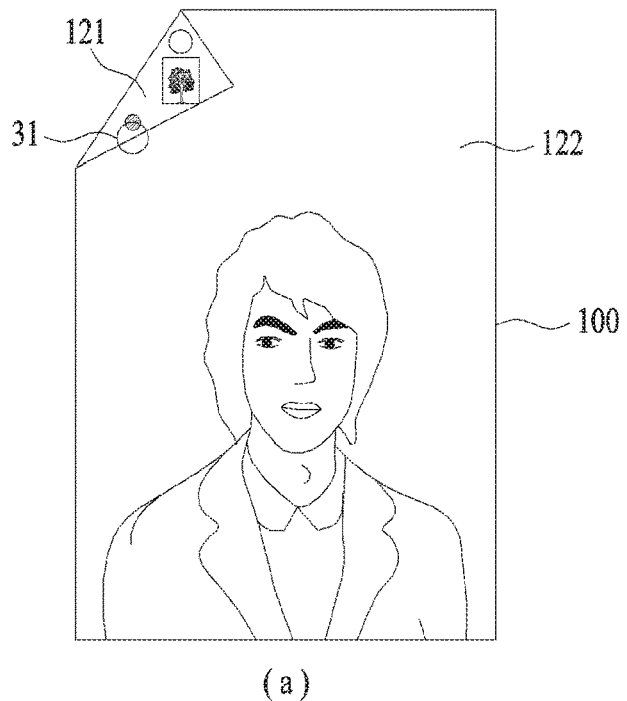
FIG. 9 is a diagram illustrating an embodiment of selecting and capturing an image in a first direction in which a camera is disposed.
Figure 9:
Figure 9:
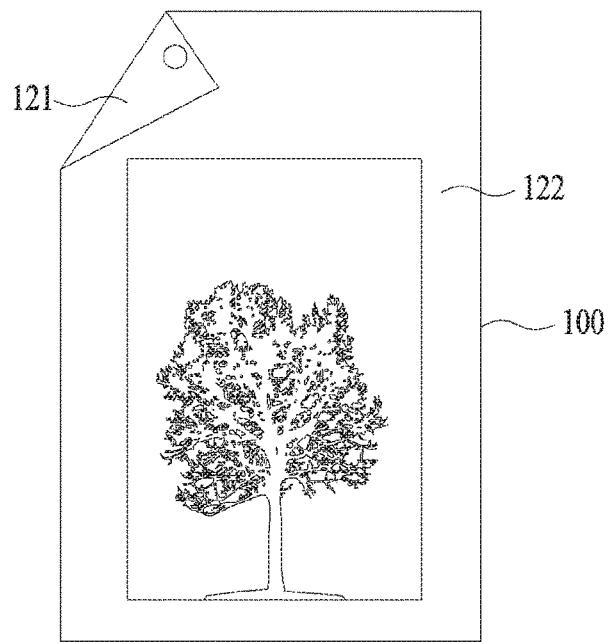

FIG. 9 is a diagram illustrating an embodiment of selecting and capturing an image in a first direction in which a camera is disposed.

FIG. 9(a) shows a screen where the photography button 31 displayed on the bent area 121 of the flexible display unit 120 is selected. In this case, the second-direction preview image may be displayed on the second direction side 122 of the flexible display unit 120 and the image temporarily captured in the first direction may be displayed on the bent area 121 of the flexible display unit 120. As described above, the photography button 31 may be displayed in the boundary area of the bent area 121 of the flexible display unit 120 and the second direction side 122 of the flexible display unit 120. In this case, the photography button 31 included in the bent area 121 of the flexible display unit 120 may be selected.

FIG. 9(b) shows a photographed image. When the photography button 31 included only in the bent area 121 of the flexible display unit 120 is selected, the image temporarily captured in the first direction can be photographed. That is, when the photography button 31 included in the bent area 121 of the flexible display unit 120 is selected from the entirety of the photography button 31, the display device 100 may photograph the image displayed on the bent area 121 of the flexible display unit 120. In this case, the photographed image may be displayed on the second direction side 122 of the flexible display unit 120 or stored.

Figure 10:
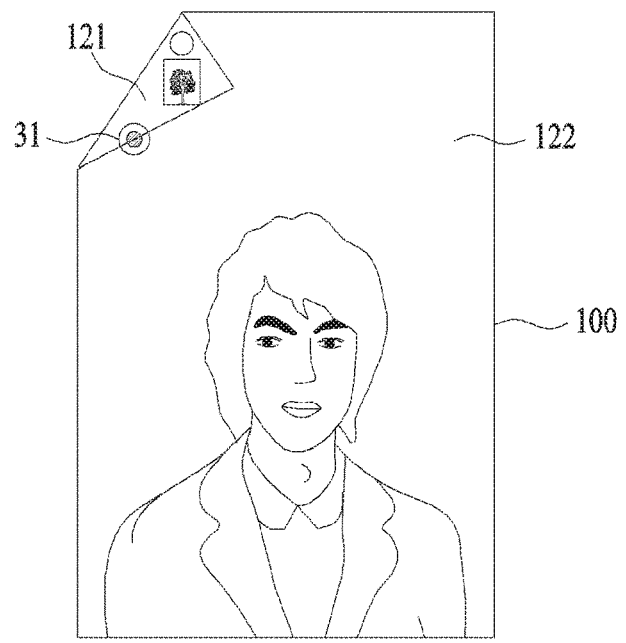
FIG. 10 is a diagram illustrating an embodiment of selecting and capturing images in both first and second directions.
Figure 10:
Figure 10:
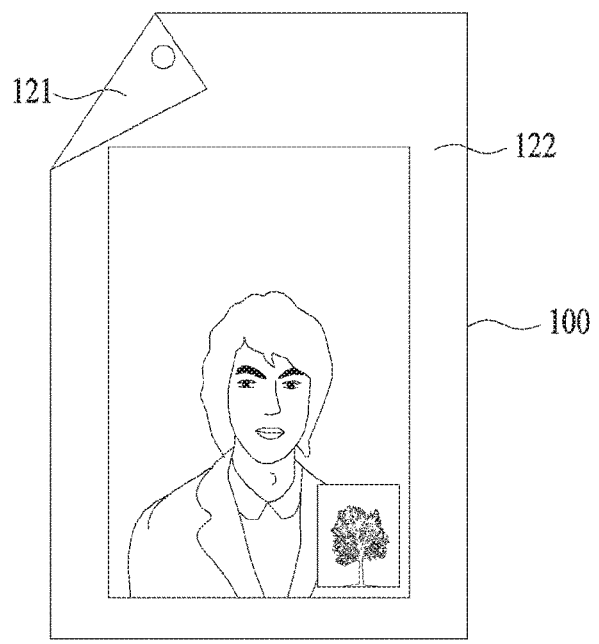

FIG. 10 is a diagram illustrating an embodiment of selecting and capturing images in both first and second directions.

FIG. 10(a) shows a screen where the photography button 31 displayed on both of the bent area 121 of the flexible display unit 120 and the second direction side 122 of the flexible display unit 120 is selected. In this case, the second-direction preview image may be displayed on the second direction side 122 of the flexible display unit 120 and the image temporarily captured in the first direction may be displayed on the bent area 121 of the flexible display unit 120. In addition, the photography button 31 displayed on both of the bent area 121 of the flexible display unit 120 and the second direction side 122 of the flexible display unit 120 can be selected.

FIG. 10(b) shows a photographed image. When the photography button 31 displayed on both of the bent area 121 of the flexible display unit 120 and the second direction side 122 of the flexible display unit 120 is selected, the image temporarily captured in the first direction and the second-direction preview image can be photographed together. That is, when the photography button 31 included in both of the bent area 121 of the flexible display unit 120 and the second direction side 122 of the flexible display unit 120 is selected, the display device 100 may photograph the image displayed on the bent area 121 of the flexible display unit 120 and the image displayed on the second direction side 122 of the flexible display unit 120. As an embodiment, the display device 100 may display one of them as a main image and the other as a sub-image. Further, when the sub-image is selected, the display device 100 may enlarge the sub-image and reduce the main image to display the main image on a partial area of the sub-image.

Figure 11:
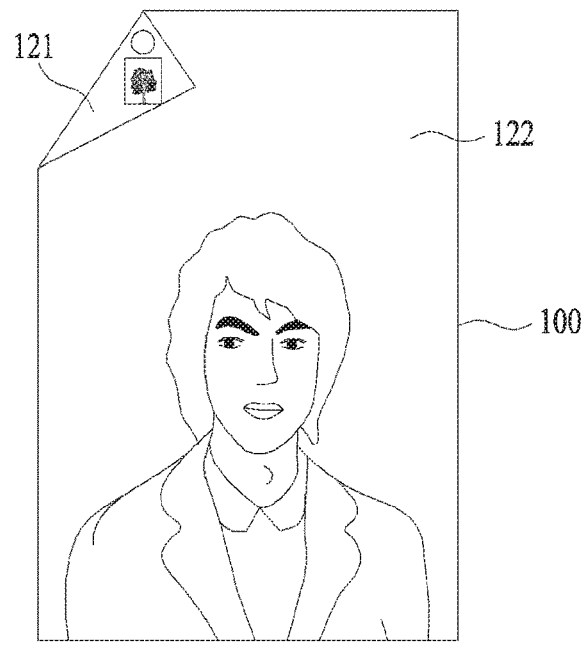
FIG. 11 is a diagram illustrating an embodiment of displaying a bent area on a display unit.
Figure 11:
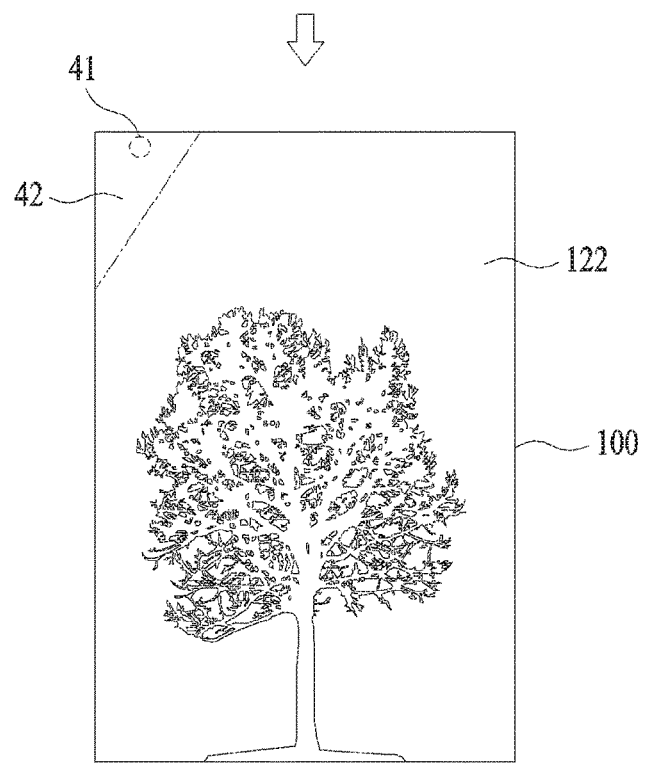

FIG. 11 is a diagram illustrating an embodiment of displaying a bent area on a display unit.

FIG. 11(a) shows that the display device 100 is bent. As described above, the flexible display device 120 can be bent. When the flexible display unit is bent at the predetermined angle or more, the display device 100 may display different images on the bent area 121 of the flexible display unit 120 and the second direction side 122 of the flexible display unit 120. As an embodiment, the image temporarily captured in the first direction can be displayed on the bent area 121 of the flexible display unit 120 and the image displayed on the second direction side 122 of the flexible display unit 120. The bent flexible display unit can be unfolded again.

FIG. 11(b) shows that the bent display device 100 is unfolded again. When the bent flexible display unit is unfolded, the display device 100 may display a first-direction preview image inputted through the camera unit 110 on the second direction side 122 of the flexible display unit 120 and delete the image temporarily captured in the first direction. Thereafter, the display device 100 may temporarily capture the image inputted through the camera unit 110 in the first direction at a predetermined time interval again.

Meanwhile, when the bent flexible display unit 120 is unfolded, the display device 100 can display a bending line of a bent area 42 of the flexible display unit 120 on the second direction side 122 of the flexible display unit 120. When the display device 100 displays the bending line, the user may bend the flexible display unit at the same position and angle. In addition, the display device 100 may display an area 41 corresponding to the position of the camera unit 110 to inform the user of the position of the camera unit 110. That is, the display device 100 may display the area 41 corresponding to the position of the camera unit 110 on the second direction side 122 of the flexible display unit 120. In this case, the area 41 corresponding to the position of the camera unit 110 can be displayed regardless of bending.

Further, the flexible display unit 120 can be randomly bent. That is, the flexible display unit 120 may be bent at a random angle or area.

Figure 12:
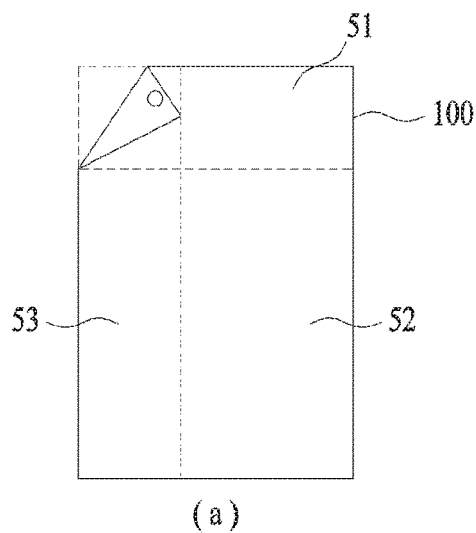
FIG. 12 is a diagram illustrating a display area of a bent flexible display unit according to an embodiment of the present invention.
Figure 12:
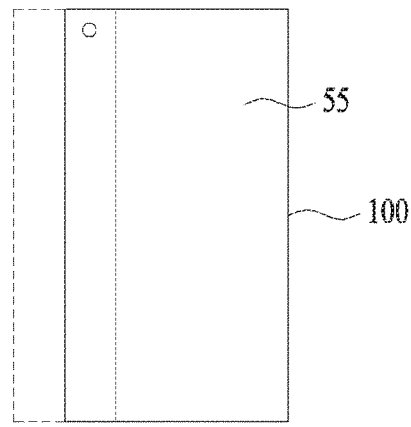
Figure 12:
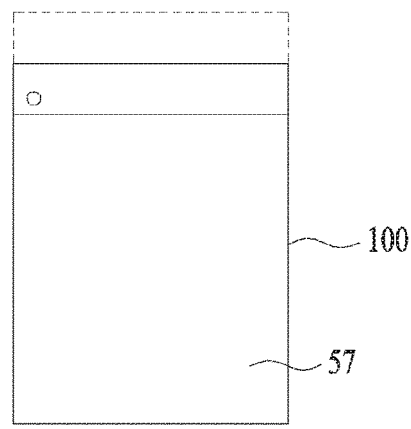

FIG. 12 is a diagram illustrating a display area of a bent flexible display unit according to an embodiment of the present invention.

FIG. 12(a) shows that the display device 100 is bent by a certain angle with respect to the vertical line of the display device 100. When the display device 100 is bent at a random angle, the display device 100 can determine a display area of the second direction side of the flexible display unit based on the bent area. As an embodiment, when the display device 100 is bent as shown in FIG. 12(*a*), the display device 100 may display an image on a second area 52. Alternatively, the display device 100 may display an image on a first area 51 and the second area 52. Further, the display device 100 may display an image on the second area 52 and a third area 53. The area for display an image can be configured manually or automatically. In the case of automatic configuration, the display device 100 may automatically configure the area according to resolution and layout of the image. For example, the display device 100 may display an image with 4:3 resolution on the second area 52 and the third area 53. In addition, the display device 100 may display an image with 16:9 resolution on the second area 52. Further, the display device 100 may display a document file on the first area 52 and the second area 52.

FIG. 12(*b*) shows that the display device 100 is bent parallel to the vertical line of the display device 100. When the display device is bent parallel to the vertical line, the display device may display an image on a fourth area 55. In some cases, the display device 100 may display an image on a partial area of the fourth area 55.

FIG. 12(*c*) shows that the display device 100 is bent parallel to the horizontal line of the display device 100. When the display device is bent parallel to the horizontal line, the display device may display an image on a fifth area 57. In some cases, the display device 100 may display an image on a partial area of the fifth area 57.

Hereinabove, various embodiments of the display device including the flexible display unit 120 have been described. In the following description, a method for controlling the display device 100 will be explained.

FIG. 13 is a flowchart for explaining a method of controlling the display device according to an embodiment of the present invention.

Referring to FIG. 13, the display device can temporarily capture a first-direction image inputted through the camera unit disposed in the first direction [S1310]. As an embodiment, the display device may temporarily capture the image in the first direction based on a predetermined time interval and a predetermined number of images.

An area of the flexible display unit including the camera unit can be bent at a predetermined angle or more in the second direction opposite to the first direction such that an image can be inputted through the camera unit in the second direction [S1320]. When the area of the flexible display unit is bent at the predetermined angle or more in the second direction, the display device can receive the image in the second direction. In some cases, the display device may rotate the image inputted in the second direction in the gravity direction of the display device, crop the rotated image, and then display the cropped image.

The display device can display the image temporarily captured in the first direction on the second direction side of the flexible display unit or the bent area of the flexible display unit [S1330]. As an embodiment, the display device may display the image temporarily captured in the first direction on the second direction side of the flexible display unit and the second-direction preview image on the bent area of the flexible display unit. Alternatively, the display device may display the image temporarily captured in the first direction on the bent area of the flexible display unit and the second-direction preview image on the second direction side of the flexible display unit.

The display device can generate a photography button at a boundary of the bent flexible display unit and the second direction side of the flexible display unit such that the photography button is partially included in both of the bent flexible display unit and the second direction side of the flexible display unit. In this case, the display unit can photograph a different image based on a selected area of the photography button.

The display device and control method thereof according to the present invention are not limited to the configurations and methods described above with reference to the embodiments, and various modifications can be made by combining some or all of the embodiments.

The control method for the display device according to the present invention may be implemented as software in a processor-readable recording medium included in the wearable device. The processor-readable recording medium includes all kinds of recording media storing data readable by a processor. Examples of the processor-readable recording medium include a ROM, a RAM, a CD-ROM, a magnetic tape, a floppy disk, an optical data storage device and may be implemented in the form of a carrier wave transmitted over the Internet. Further, the processor-readable recording medium may be distributed to computer systems connected through a network, stored and executed as code readable in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Mode for Invention

What is claimed is:

1. A display device comprising:
   a flexible display unit configured to display images in two directions;
   a camera unit disposed in a first direction and configured to:
      when the flexible display unit is not bent, receive as an input an image in the first direction; and
      when an area of the flexible display unit, in which the camera unit is included, is bent in a second direction opposite to the first direction at a predetermined angle or more, receive as an input an image in the second direction; and
   a control unit configured to:
      temporarily capture the image received in the first direction;
      cause the flexible display unit to display the image temporarily captured in the first direction on a second direction side of the flexible display unit or the bent area of the flexible display unit in response to the bending of the area of the flexible display unit in the second direction;
      cause the image received in the second direction to rotate in a gravity direction of the display device;
      crop the rotated image based on a screen ratio of the flexible display unit with respect to the rotation direction of the image; and
      cause the flexible display unit to display the cropped image.

2. The display device of claim 1, wherein the control unit is configured to temporarily capture the image in the first direction at a predetermined period and delete the image temporarily captured in the first direction after elapse of a predetermined time.

3. The display device of claim 1, wherein when the image temporarily captured in the first direction is displayed on the bent area of the flexible display unit, the control unit is configured to display the image received in the second direction on the second direction side of the flexible display device.

4. The display device of claim 1, wherein when the image temporarily captured in the first direction is displayed on the second direction side of the flexible display unit, the control unit is configured to display the image received in the second direction on the bent area of the flexible display unit.

5. The display device of claim 4, wherein the control unit is configured to further display at least one photography image associated with the image temporarily captured in the first direction on the second direction side of the flexible display unit.

6. The display device of claim 5, wherein the photography image associated with the image temporarily captured in the first direction comprises at least one of an image including a same person, an image including a same background, and an image photographed within a predetermined time range.

7. The display device of claim 1, wherein when the bent area of the flexible display unit is unfolded, the control unit is configured to delete the image temporarily captured in the first direction.

8. The display device of claim 7, wherein the control unit is configured to control the flexible display unit to display a bending line of the bent area of the flexible display unit on the second direction side of the flexible display unit.

9. The display device of claim 1, wherein the control unit is configured to control the flexible display unit to display an area corresponding to a position of the camera unit on the second direction side of the flexible display unit.

10. The display device of claim 1, wherein the control unit is configured to display a menu related to photography on the bent area of the flexible display unit.

11. The display device of claim 1, wherein the control unit is configured to generate a photography button at a boundary of the bent area of the flexible display unit and the second direction side of the flexible display unit such that the photography button is included in both of the bent area of the flexible display unit and the second direction side of the flexible display unit.

12. The display device of claim 11, wherein when only a part of the photography button, which is included in the bent area of the flexible display unit, is selected, the control unit is configured to photograph an image displayed on the bent area of the flexible display unit.

13. The display device of claim 11, wherein when only a part of the photography button, which is included in the second direction side of the flexible display unit, is selected, the control unit is configured to photograph an image displayed on the second direction side of the flexible display unit.

14. The display device of claim 11, wherein when the entirety of the photography button included in the both of the bent area of the flexible display unit and the second direction side of the flexible display unit is selected, the control unit is configured to photograph images displayed on the bent area of the flexible display unit and the second direction side of the flexible display unit.

15. The display device of claim 1, wherein an upper side of the display device and an upper side of the camera unit are in parallel when the flexible display unit is not bent.

16. The display device of claim 15, wherein the upper side of the camera unit is inclined with respect to the upper side of the display device when the area of the flexible display unit is bent.

17. A method for controlling a display device including a flexible display unit capable of displaying images in two directions, the method comprising:
    temporarily capturing an image in a first direction by receiving as an input the image through a camera unit disposed in the first direction when the flexible display unit is not bent;
    sensing bending of an area of the flexible display unit, in which the camera unit is included, in a second direction opposite to the first direction at a predetermined angle or more such that the camera unit receives as an input an image in the second direction;
    displaying the image temporarily captured in the first direction on a second direction side of the flexible display unit or the bent area of the flexible display unit in response to the bending of the area of the flexible display unit in the second direction;
    rotating the image received in the second direction in a gravity direction of the display device;
    cropping the rotated image based on a screen ratio of the flexible display unit with respect to the rotation direction of the image; and
    displaying the cropped image.

18. The method of claim 17, wherein displaying the image temporarily captured in the first direction comprises displaying the image temporarily captured in the first direction on the second direction side of the flexible display unit and wherein displaying the image received in the second direction comprises displaying the image received in the second direction on the bent area of the flexible display unit.

19. The method of claim 18, further comprising, when the bent area of the flexible display unit is unfolded, displaying a bending line of the bent area of the flexible display unit on the second direction side of the flexible display unit.

20. The method of claim 17, further comprising generating a photography button at a boundary of the bent area of the flexible display unit and the second direction side of the flexible display unit such that the photography button is included in both of the bent area of the flexible display unit and the second direction side of the flexible display unit.

* * * * *